(12) United States Patent (10) Patent No.: US 12,589,697 B2
Sato et al. (45) Date of Patent: Mar. 31, 2026

(54) VEHICLE ROOF-RAIL STRUCTURE

(71) Applicant: SUBARU CORPORATION, Tokyo (JP)

(72) Inventors: Atsushi Sato, Tokyo (JP); Yasuhiko Irie, Tokyo (JP); Kenji Nakazawa, Tokyo (JP); Tatsuya Kawashima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 132 days.

(21) Appl. No.: 18/545,417

(22) Filed: Dec. 19, 2023

(65) Prior Publication Data

US 2024/0253572 A1 Aug. 1, 2024

(30) Foreign Application Priority Data

Jan. 30, 2023 (JP) ................................. 2023-011770

(51) Int. Cl.
B60R 9/04 (2006.01)
(52) U.S. Cl.
CPC ...................................... B60R 9/04 (2013.01)
(58) Field of Classification Search
CPC ....................................................... B60R 9/04
USPC ........................................ 224/309, 325–327
See application file for complete search history.

(56) References Cited

U.S. PATENT DOCUMENTS

| | | | | |
|---|---|---|---|---|
| 5,497,925 A * | 3/1996 | Lumpe | ...................... | B60R 9/04 |
| | | | | 224/326 |
| 6,267,281 B1 * | 7/2001 | Nerling | ..................... | B60R 9/04 |
| | | | | 224/325 |
| 8,123,091 B2 * | 2/2012 | Kiyota | ...................... | B60R 9/04 |
| | | | | 277/630 |
| 10,464,494 B2 * | 11/2019 | Chen | .......................... | B60R 9/04 |
| 2015/0247524 A1 * | 9/2015 | Utsuno | ................. | F16B 43/001 |
| | | | | 411/542 |
| 2017/0015253 A1 * | 1/2017 | Shibata | ................... | B60R 13/07 |

FOREIGN PATENT DOCUMENTS

| | | | | |
|---|---|---|---|---|
| EP | 3061979 A1 * | 8/2016 | ........... | F16B 33/004 |
| FR | 3117434 A1 * | 6/2022 | ............... | B60R 9/04 |
| WO | WO2014/080511 A1 | 5/2014 | | |

* cited by examiner

*Primary Examiner* — Scott T McNurlen
(74) *Attorney, Agent, or Firm* — McGinn IP Law Group, PLLC

(57) ABSTRACT

A vehicle roof-rail structure includes a rail body extending in a front-rear direction, and a leg member with which the rail body is fixed to a roof panel of a vehicle body. The leg member includes a protector that is in contact with the roof panel, a leg disposed on the protector, a fastener including a bolt projecting from a bottom of the leg and fastening the leg member to the roof panel with the bolt extending through the protector and the roof panel, and a water stopper. The water stopper includes a lower sealing rib that projects, around the bolt, from a lower surface of the protector and is in contact with the roof panel; and an upper sealing rib that projects, around the bolt, from an upper surface of the protector and is in contact with a bottom surface of the leg.

18 Claims, 4 Drawing Sheets

FIG. 3

VEHICLE ROOF-RAIL STRUCTURE

CROSS-REFERENCE TO RELATED APPLICATIONS

The present application claims priority from Japanese Patent Application No. 2023-011770 filed on Jan. 30, 2023, the entire contents of which are hereby incorporated by reference.

BACKGROUND

The disclosure relates to a vehicle roof-rail structure.

Some known vehicles each include a pair of roof rails disposed on respective left and right sides of a roof panel and extending in the vehicle front-rear direction. The roof rails are typically provided to sport utility vehicles (SUVs) and station wagons. When a carrier is disposed over the pair of roof rails and is fixed thereto, a space for carrying baggage is provided outside the vehicle.

The roof rails are each provided as an assembly obtained in advance and are attached to the roof panel in an assembly line. To attach the roof rail to the roof panel, bolts projecting downward from the roof rail are inserted into bolt-receiving holes provided in the roof panel. Then, the bolts now projecting downward from the roof panel are fastened with nuts.

Each of the bolts is joined to the roof panel with a metal-touch member in between, and the joint is sealed therearound with a seal. Thus, the probability of water leakage through the bolt-receiving holes is reduced.

Such a metal-touch member and a seal are integrated into a single component known as a seal washer. An exemplary seal washer is disclosed by WO2014/080511.

The seal washer disclosed by WO2014/080511 includes a metal-touch body having a hole in the center thereof, and elastic members attached to the upper-inner periphery and the lower-outer periphery, respectively, of the metal-touch body. The elastic members have respective annular projections projecting relative to the respective surfaces of the metal-touch body. The seal washer is interposed between a bolt and a roof panel, and the three are fastened altogether, whereby the metal-touch body is held between the bolt and the roof panel, with the projections of the elastic members being in close contact with the bolt and the roof panel. Thus, watertightness is provided.

SUMMARY

An aspect of the disclosure provides a vehicle roof-rail structure including a rail body and a leg member. The rail body extends in a front-rear direction of a vehicle body. The leg member is used to fix the rail body to a roof panel of the vehicle body. The leg member includes a protector, a leg, a fastener, and a water stopper. The protector is brought into contact with the roof panel. The leg is disposed on the protector. The fastener includes a bolt projecting from a bottom of the leg and fastens the leg member to the roof panel with the bolt being made to extend through the protector and the roof panel. The water stopper provides watertightness around the fastener. The water stopper includes a lower sealing rib and an upper sealing rib. The lower sealing rib projects from a lower surface of the protector in such a manner as to surround the bolt and is brought into contact with the roof panel. The upper sealing rib projects from an upper surface of the protector in such a manner as to surround the bolt and is brought into contact with a bottom surface of the leg.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 3 illustrates a section taken along line III-III given in FIG. 2;

DETAILED DESCRIPTION

Figure 1:
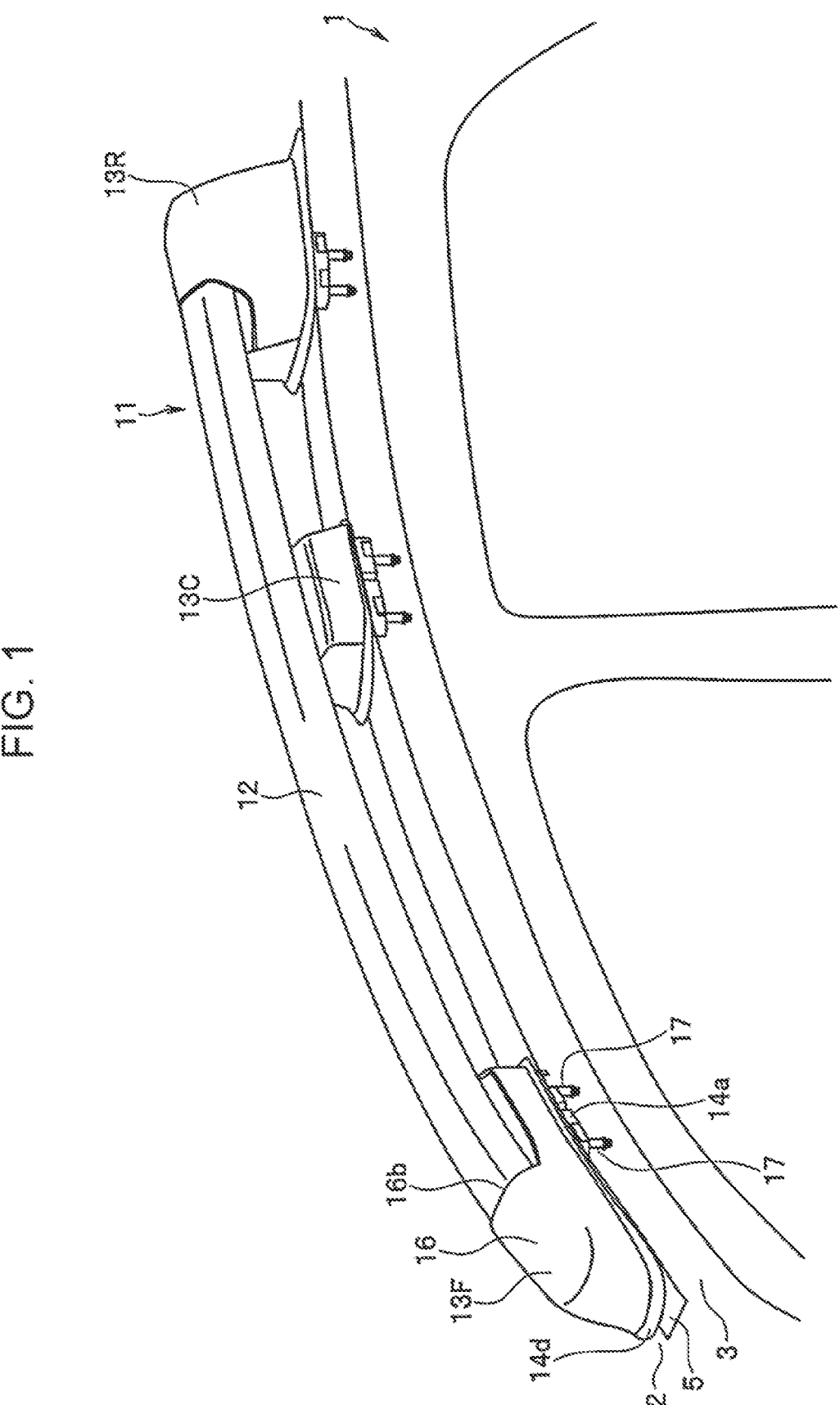
FIG. 1 is a perspective view of a roof rail.

The seal washer disclosed by WO2014/080511 is expensive. Therefore, it costs high if the seal washer is provided for each of all the bolts projecting downward from the roof rails attached to the roof panel.

That is, if it is possible to omit such seal washers while ensuring watertightness, the number of components is reduced. Accordingly, the product cost is reduced.

It is desirable to provide a vehicle roof-rail structure that includes no seal washers and with which watertightness at the joint between each bolt included in a roof rail and the roof panel included in a vehicle body is provided with a reduced product cost.

An embodiment of the disclosure will now be described with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A vehicle body 1 according to the embodiment includes a roof top panel 2 and a roof side panel 3. The roof side panel 3 is disposed on each of the two sides of the roof top panel 2 in the vehicle widthwise direction and extends in the front-rear direction, thereby forming a side edge of the vehicle body 1. In the present embodiment, the roof top panel 2 and the roof side panels 3 are collectively referred to as a roof panel.

Figure 3:
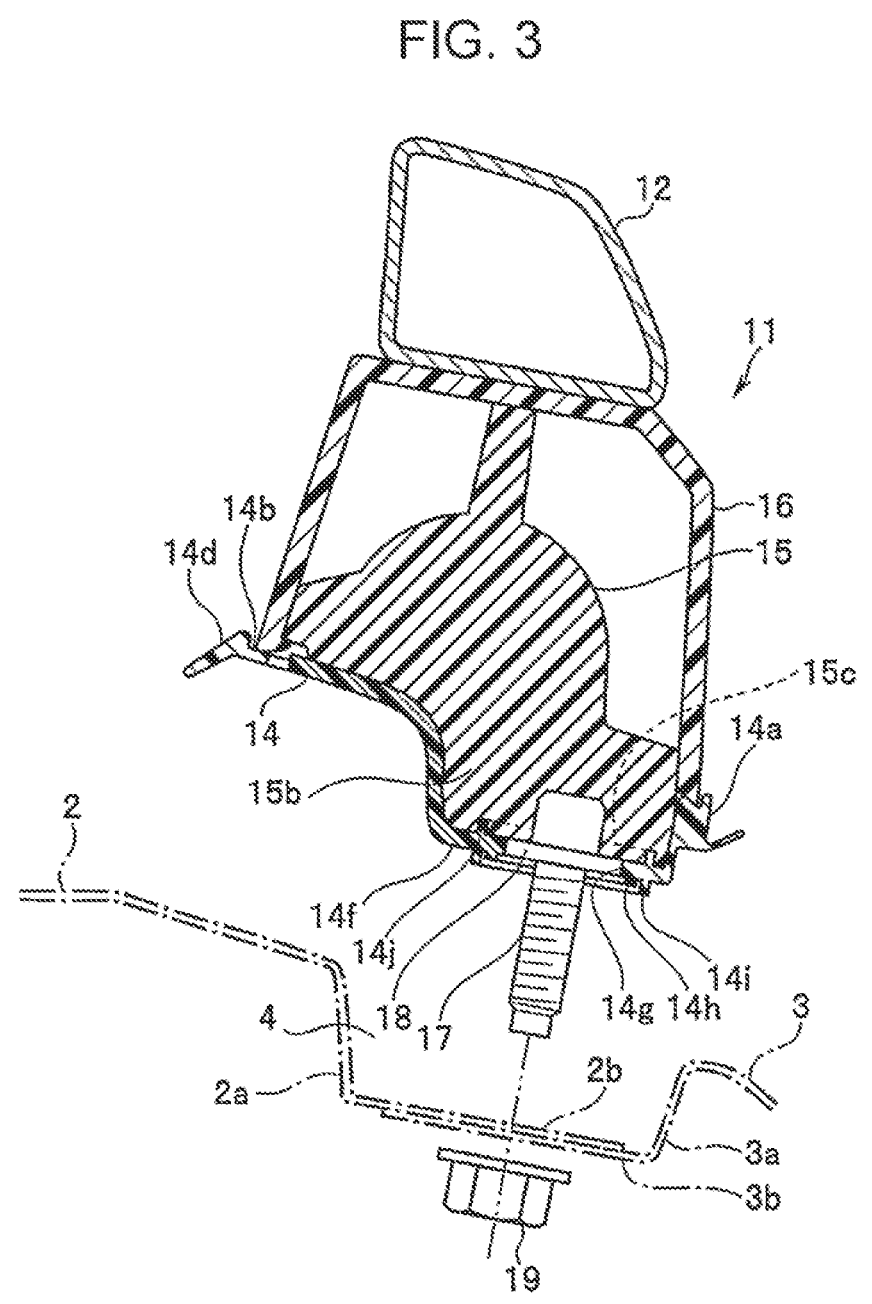

A portion of the roof top panel 2 that is at an end in the vehicle widthwise direction and a portion of each roof side panel 3 that is at an end in the vehicle widthwise direction define a mohican groove 4 (see FIG. 3). The respective portions of the roof top panel 2 and the roof side panel 3, which are hereinafter referred to as lateral end portions 2a and 3a, are joined to each other to form the bottom of the mohican groove 4.

The lateral end portion 2a of the roof top panel 2 is folded in a Z shape in front view to have a sidewall and a bottom wall 2b, which define one side of the mohican groove 4. The lateral end portion 3a of the roof side panel 3 is folded in a reverse Z shape in front view to have a sidewall and a bottom wall 3b, which define the other side of the mohican groove 4. The bottom wall 2b in the lateral end portion 2a of the roof top panel 2 and the bottom wall 3b in the lateral end portion 3a of the roof side panel 3 are placed one on top of the other and joined to each other with a welding technique such as spot welding. Thus, the mohican groove 4 is obtained. The mohican groove 4 is filled with a molding 5.

A roof rail 11 is fixed at the mohican groove 4. The roof rail 11 is provided as an assembly obtained in advance, and the assembly is attached to the vehicle body 1. The roof rail 11 includes a rail body 12, which is hollow in sectional view and extends in the front-rear direction of the vehicle body 1. The rail body 12 is an extrusion-molded part that is made from an aluminum alloy.

The roof rail 11 has a ladder structure and is supported by the roof top panel 2 and the mohican groove 4 at a front part, a rear part, and a central part of the rail body 12 with the aid of a front leg member 13F, a rear leg member 13R, and a center leg member 13C, respectively. The roof rail 11 illustrated in the drawings is the one disposed on the left side. The roof rail disposed on the right side is symmetrical to the roof rail 11 disposed on the left side and is therefore not described herein. In the present embodiment, the configuration of the leg member according to an aspect of the disclosure applies to each of the leg members 13F, 13R, and 13C. That is, the leg members 13F, 13R, and 13C are substantially the same. Therefore, the following description focuses on the front leg member 13F, and the rear leg member 13R and the center leg member 13C are not described herein.

Figure 2:
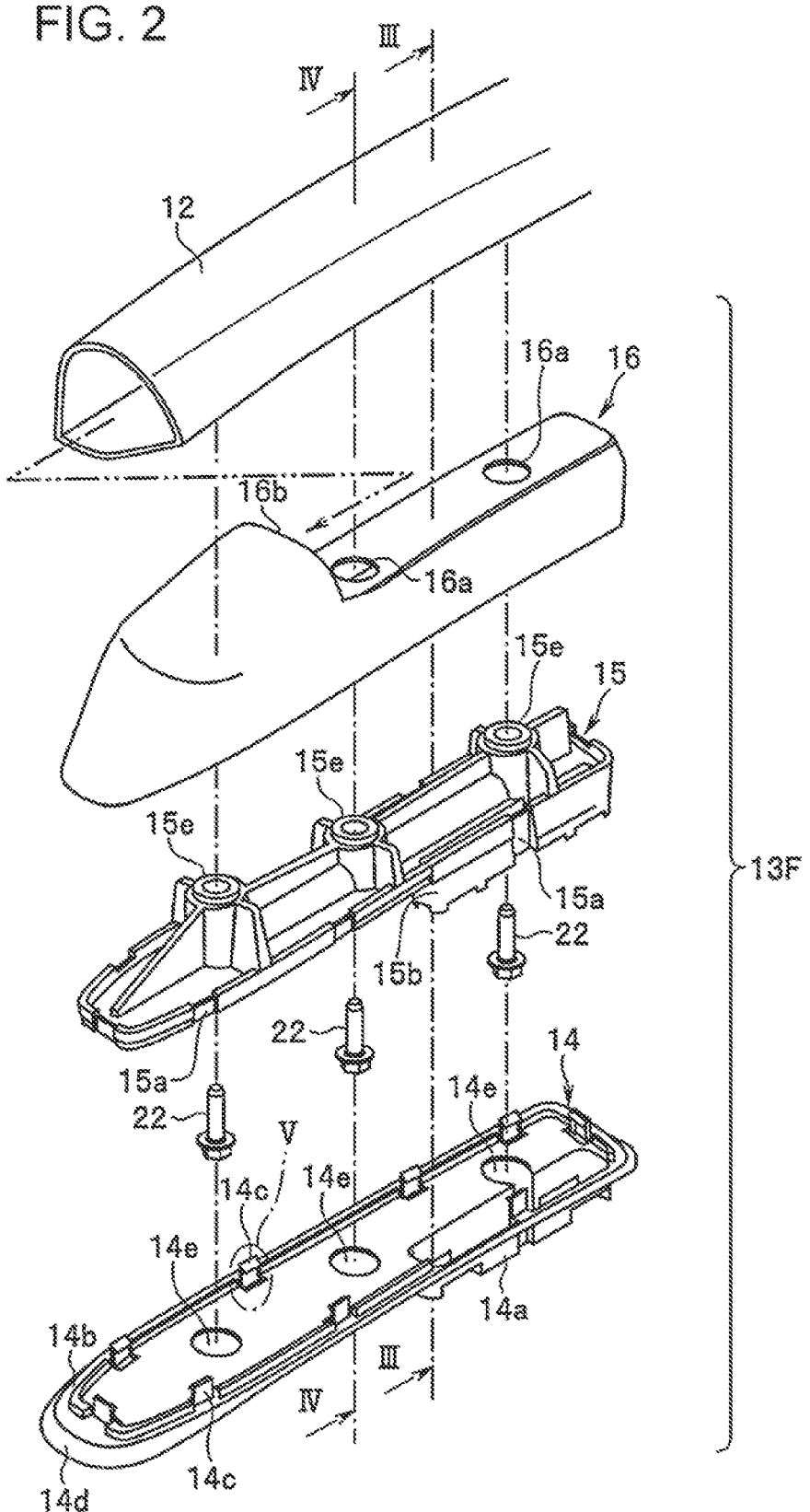
FIG. 2 is an exploded perspective view of a front part of the roof rail.

Referring to FIG. 2, the front leg member 13F includes a protector 14, a leg 15, and a leg cover 16. The protector 14 is made of an elastic material such as thermoplastic elastomer or synthetic rubber. The protector 14 has a long, narrow, boat-like shape extending in the front-rear direction of the vehicle body 1. The protector 14 is disposed astride the roof top panel 2 and the molding 5. The protector 14 includes a fitting part 14a, which projects downward from a rear outer part, in the vehicle widthwise direction, of the protector 14. The fitting part 14a is fitted to a part of the mohican groove 4 where the molding 5 is cut away correspondingly.

The protector 14 has at the periphery thereof a groove 14b. The lower end of the leg cover 16 is fitted into and positioned in the groove 14b. The protector 14 includes hooks 14c, which are arranged at predetermined intervals on the inner peripheral edge of the groove 14b. The hooks 14c are hooked onto respective hook-receiving parts 15a, which are provided at the outer periphery of the leg 15, which will be described below, and in correspondence with the hooks 14c. The leg 15 is positioned when the hook-receiving parts 15a thereof receive the respective hooks 14c.

The protector 14 further includes at the outer periphery thereof a skirt 14d. When the skirt 14d is brought into contact with the roof top panel 2 and the roof side panel 3 that forms the sidewall of the mohican groove 4, the skirt 14d undergoes elastic deformation along the roof top panel 2 and the sidewall and comes into close contact therewith. The protector 14 further has three relief holes 14e, which are to receive respective bolt fasteners and are arranged at predetermined intervals.

Referring to FIG. 3, the fitting part 14a includes a bottom 14f, where two washer-receiving holes 14g are provided.

The washer-receiving holes 14g are provided with respective washers 18, which will be described separately below. The two washer-receiving holes 14g provided in the fitting part 14a are arranged at a predetermined interval in the front-rear direction of the vehicle body 1.

As illustrated in FIG. 3, the bottom 14f is slightly thicker than the individual washers 18. At the lower surface of the bottom 14f, the washer-receiving holes 14g are each surrounded by a first sealing rib 14h, which may serve as a lower sealing rib in one embodiment. The first sealing rib 14h is surrounded by a second sealing rib 14i, which may serve as a second lower sealing rib in one embodiment. The first sealing rib 14h has a shorter height than the second sealing rib 14i. At the upper surface of the bottom 14f, the washer-receiving holes 14g are each surrounded by a third sealing rib 14j, which may serve as an upper sealing rib in one embodiment. A combination of the first to third sealing ribs 14h to 14j may serve as a water stopper in one embodiment.

The leg 15 is a molded component made of synthetic resin such as nylon resin and is hard to some extent. The outer periphery of the leg 15 is shaped in conformity with the inner periphery of the groove 14b provided in the protector 14. The outer edge of the leg 15 is hooked by and positioned at the hooks 14c of the protector 14 (see FIG. 5).

The leg 15 includes a projection 15b. The projection 15b is fitted to the fitting part 14a of the protector 14. The projection 15b projects downward. The projection 15b is provided with insert bolts 17, which are permanently affixed to the projection 15b. The insert bolts 17 are coaxial with the respective washer-receiving holes 14g provided in the protector 14. The insert bolts 17 are provided in advance with the respective washers 18 at the heads thereof. The insert bolts 17 are inserted into respective bolt-receiving holes (not illustrated) provided in the mohican groove 4 and are fastened to the mohican groove 4 with respective nuts 19. In this process, the lower surfaces of the washers 18 are metal-touched to the bottom surface of the mohican groove 4. A combination of each of the insert bolts 17 and a corresponding one of the nuts 19 may serve as a fastener in one embodiment.

At the bottom surface of the projection 15b, annular grooves 15c are provided in such a manner as to surround the respective insert bolts 17. The grooves 15c are to receive the respective third sealing ribs 14j. The grooves 15c and the third sealing ribs 14j have an equal radius and are coaxial with each other in the assembled form. The grooves 15c are slightly wider than the third sealing ribs 14j. Furthermore, the depth of the grooves 15c is slightly smaller than the height of the third sealing ribs 14j.

Figure 4:
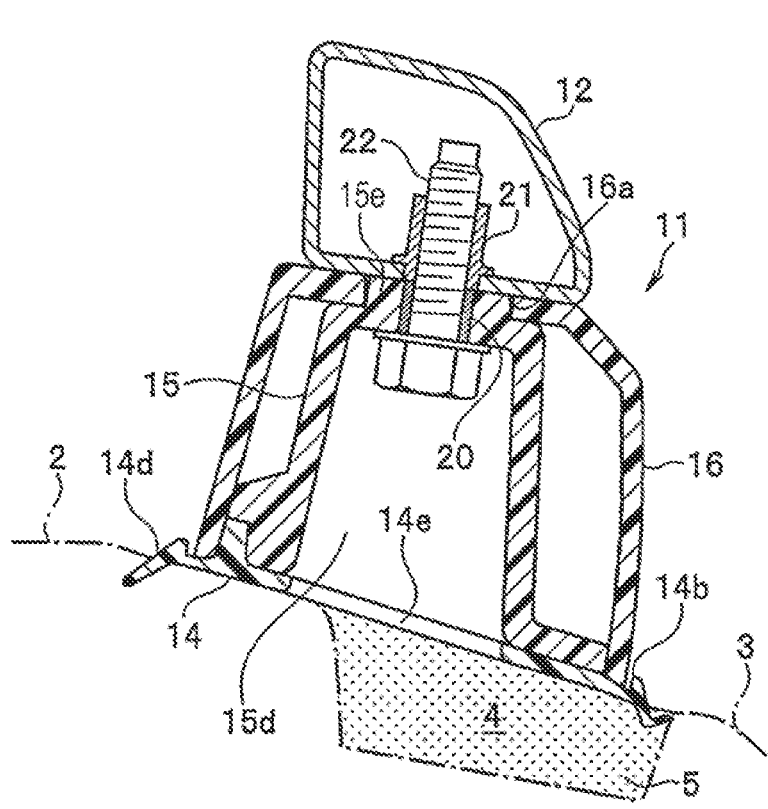
FIG. 4 illustrates a section taken along line IV-IV given in FIG. 2.

Referring to FIG. 4, the leg 15 has three bolt-inserting recesses 15d, which are located at substantially the center of the leg 15 in the vehicle widthwise direction. The three bolt-inserting recesses 15d are arranged at predetermined intervals in correspondence with the relief holes 14e provided in the protector 14. The bolt-inserting recesses 15d are provided with respective insert spacers 20, which are permanently affixed to top parts of the bolt-inserting recesses 15d. The insert spacers 20 each have an opening with an end face thereof being flush with the top face of a corresponding one of the bolt-inserting recesses 15d. The top face of each bolt-inserting recess 15d has a projection 15e. The projection 15e surrounds the insert spacer 20 and is coaxial with the insert spacer 20.

Figure 5:
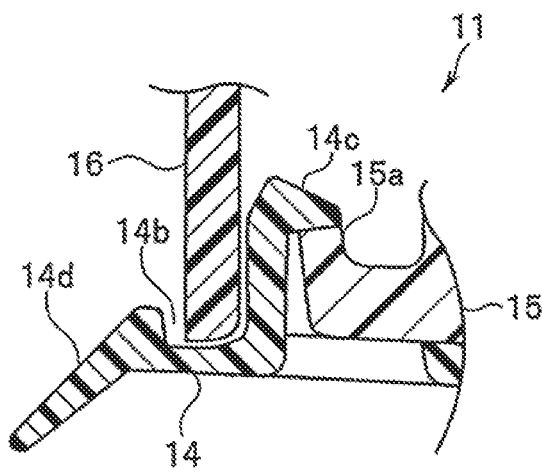
FIG. 5 illustrates a section at a part denoted by V in FIG. 2.

The leg cover 16 is disposed over the leg 15 from above, and the outer periphery of the leg cover 16 is fitted into the groove 14b provided in the protector 14 (see FIGS. 3 to 5).

The leg cover 16 has holes 16*a*, into which the respective projections 15*e* of the leg 15 are fitted. As illustrated in FIG. 4, the thickness of the leg cover 16 at the holes 16*a* is equal to the height of the projections 15*e*.

The leg cover 16 has a receiving recess 16*b*. The receiving recess 16*b* has an opening extending substantially horizontally. One end part of the rail body 12 is fitted into the receiving recess 16*b*. The rail body 12 is fastened to the leg cover 16 with bolts 22. The rail body 12 is provided at the bottom thereof with rivet nuts (also referred to as "blind nuts") 21. The rivet nuts 21 are attached in advance at such positions of the rail body 12 as to be coaxial with the respective insert spacers 20 in the assembled form. The rail body 12 is further provided with other rivet nuts 21 (not illustrated) at the central part and the other end part of the bottom thereof. The bolts 22 are inserted through the leg 15 into the rivet nuts 21 in the receiving recess 16*b*, thereby fastening the rail body 12 and the leg cover 16 together.

Now, how to assemble the roof rail 11 configured as above will be described.

To assemble the roof rail 11, the leg 15 is first placed onto the upper surface of the protector 14. Then, the hook-receiving parts 15*a* provided at the periphery of the leg 15 are made to receive the hooks 14*c* provided at the periphery of the protector 14 and are thus positioned. The bottom surface of the leg 15 rests on the upper surface of the protector 14. Accordingly, the insert bolts 17 pass through the washer-receiving holes 14*g* provided in the protector 14 and project downward from the protector 14. Furthermore, the annular grooves 15*c* provided in the bottom surface of the leg 15 and surrounding the insert bolts 17 are fitted onto the annular third sealing ribs 14*j* included in the protector 14 and are positioned thereon. In this state, since the depth of the grooves 15*c* is smaller than the height of the third sealing ribs 14*j*, the third sealing ribs 14*j* come into contact with the bottom surfaces of the grooves 15*c*. On the other hand, the insert bolts 17 are yet to be fastened to the bottom walls 2*b* and 3*b* of the mohican groove 4. Therefore, the third sealing ribs 14*j* are yet to undergo elastic deformation.

Subsequently, the leg cover 16 is attached to the protector 14 in such a manner as to cover the leg 15. Furthermore, the lower end of the leg cover 16 is fitted into the groove 14*b* provided at the periphery of the protector 14 (see FIG. 5). Furthermore, the holes 16*a* provided in the leg cover 16 are fitted onto the projections 15*e* provided at the top faces of the bolt-inserting recesses 15*d* provided in the leg 15, and are positioned. Thus, the assembly of the front leg member 13F is complete. The rear leg member 13R and the center leg member 13C are also assembled by following the above process.

Then, the leg members 13F, 13R, and 13C assembled as above are attached to the rail body 12. The front leg member 13F is attached to the rail body 12 such that the receiving recess 16*b* provided in the leg cover 16 is fitted onto the front end part of the rail body 12. Subsequently, the bolts 22 are inserted into the relief holes 14*e* provided in the protector 14 and are further inserted into the insert spacers 20, which are obtained through insert molding, at the top parts of the bolt-inserting recesses 15*d* provided in the leg 15. Furthermore, the bolts 22 are screwed into the rivet nuts 21 attached at the bottom of the rail body 12, whereby the front leg member 13F is fixed to the front end part of the rail body 12. The rear leg member 13R and the center leg member 13C are also fixed to the rail body 12 by following the above process. Thus, the assembly of the roof rail 11 is complete.

Subsequently, the roof rail 11 is attached to the vehicle body 1. The mohican groove 4 provided in the vehicle body

1 is filled with the molding 5. The fitting part 14*a* projecting downward from the protector 14 is fitted into a part of the mohican groove 4 where the molding 5 is cut away. As illustrated in FIG. 3, the fitting part 14*a* is fitted into the mohican groove 4 such that the insert bolts 17 projecting downward from the fitting part 14*a* are inserted into the bolt-receiving holes (not illustrated) provided in the mohican groove 4.

Subsequently, the nuts 19 are screwed tightly onto the insert bolts 17 projecting toward the other side of the mohican groove 4. Thus, the leg 15 is pulled toward the nuts 19 through the insert bolts 17, and the bottom surface of the fitting part 14*a* of the protector 14 is pressed against the bottom surface of the mohican groove 4.

Accordingly, the leg 15 presses the protector 14, whereby the skirt 14*d* at the outer periphery of the protector 14 undergoes elastic deformation along the surfaces of the roof top panel 2, the molding 5, and the roof side panel 3.

Furthermore, the third sealing ribs 14*j* at the upper surface of the bottom 14*f* of the protector 14 are pressed into the grooves 15*c* provided in the leg 15 and undergo elastic deformation to close the grooves 15*c*. Furthermore, the second sealing ribs 14*i* at the lower surface of the bottom 14*f* of the fitting part 4*a* are pressed against the bottom surface of the mohican groove 4 and undergo elastic deformation to be in close contact therewith. Furthermore, the first sealing ribs 14*h* on the inner peripheral side relative to the second sealing ribs 14*i* are pressed against the bottom surface of the mohican groove 4 and undergo elastic deformation to be in close contact therewith.

Consequently, the grooves 15*c* located between the bottom surface of the projection 15*b* of the leg 15 and the upper surface of the bottom 14*f* of the fitting part 14*a* of the protector 14 are closed in a watertight manner by the elastically deformed third sealing ribs 14*j*. Furthermore, a gap between the bottom surface of the mohican groove 4 and the lower surface of the bottom 14*f* of the protector 14 is closed by the elastically deformed first and second sealing ribs 14*h* and 14*i* in a watertight manner. Therefore, rainwater is less likely to enter the washer-receiving holes 14*g* each surrounded by the sealing ribs 14*h* to 14*j* and the bolt-receiving holes provided in the mohican groove 4.

Subsequently, the nuts 19 are further tightened to apply an axial force to the insert bolts 17. Accordingly, the bottom 14*f* of the fitting part 14*a* of the protector 14 is nipped between the leg 15 and the bottom of the mohican groove 4 and undergoes elastic deformation. Thus, the lower surfaces of the washers 18 at the heads of the insert bolts 17 are metal-touched to the mohican groove 4. Therefore, the nuts 19 are less likely to be loosened.

To summarize, the vehicle roof-rail structure according to the present embodiment is configured as follows. The bolts (insert bolts) 17 with which the roof rail 11 is attached to the mohican groove 4 are integrated with the leg 15 through insert molding. The insert bolts 17 are provided at the heads thereof with the respective washers 18 whose lower surfaces are metal-touched to the mohican groove 4. The washer-receiving holes 14*g* provided in the protector 14 are each surrounded on the lower side thereof by the annular first and second sealing ribs 14*h* and 14*i*. The washer-receiving holes 14*g* provided in the protector 14 are each further surrounded on the upper side thereof by the annular third sealing rib 14*j*. The leg 15 has at the bottom surface thereof the annular grooves 15*c* into which the respective third sealing ribs 14*j* are fitted.

When the insert bolts 17 are inserted into the bolt-receiving holes provided in the mohican groove 4 and are fastened with the nuts 19, the leg 15 is pulled toward the nuts 19. Accordingly, the first and second sealing ribs 14*h* and 14*i* come into close contact with the bottom surface of the mohican groove 4 in a watertight manner. Furthermore, the third sealing ribs 14*j* are pressed into the grooves 15*c* provided in the leg 15 and are closely fitted in the grooves 15*c* in a watertight manner.

In the present embodiment, the leg 15 and the protector 14 are assembled into a watertight structure to reduce the entry of rainwater into the washer-receiving holes 14*g* and into the bolt-receiving holes of the mohican groove 4. Thus, the seal washers employed in the known art are omitted. Accordingly, the number of components is reduced. Furthermore, the washers metal-touched are each usable alone. Correspondingly, the product cost is reduced.

The disclosure is not limited to the above embodiment. For example, in the case of a roof panel with no mohican groove 4, the roof rail 11 may be directly attached to the roof top panel 2. Furthermore, the washers 18 may be fitted in advance to the washer-receiving holes 14*g* of the protector 14.

According to an aspect of the disclosure, the bolt included in the fastener fastening the leg and the protector to the roof panel is surrounded by the lower sealing rib and the upper sealing rib in a watertight manner. The lower sealing rib projects from the lower surface of the protector and is brought into contact with the roof panel. The upper sealing rib projects from the upper surface of the protector and is brought into contact with the bottom surface of the leg. Thus, watertightness at the joint between the bolt, included in the roof rail, and the roof panel, included in the vehicle body, is provided with no seal washers employed. Furthermore, since the seal washers are omitted, the product cost is reduced.

The invention claimed is:

1. A vehicle roof-rail structure comprising:
   a rail body extending in a front-rear direction of a vehicle body; and
   a leg member with which the rail body is fixed to a roof panel of the vehicle body,
   wherein the leg member comprises:
      a protector that is in contact with the roof panel;
      a leg disposed on the protector;
      a fastener comprising a bolt projecting from a bottom of the leg, the fastener fastening the leg member to the roof panel with the bolt being made to extend through the protector and the roof panel; and
      a water stopper for providing watertightness around the fastener,
   wherein the water stopper comprises:
      a lower sealing rib that projects from a lower surface of the protector in such a manner as to surround the bolt and is brought into contact with the roof panel; and
      an upper sealing rib that projects from an upper surface of the protector in such a manner as to surround the bolt and is brought into contact with a bottom surface of the leg,
   wherein the bottom surface of the leg has an annular groove that is fitted onto and positioned at the upper sealing rib, the annular groove having a depth less than a height of the upper sealing rib and a width greater than a width of the upper sealing rib.

2. The vehicle roof-rail structure according to claim 1, wherein the lower sealing rib surrounding the bolt is surrounded by a second lower sealing rib projecting from the lower surface of the protector.

3. The vehicle roof-rail structure according to claim 2, wherein the protector has a washer-receiving hole at such a position as to allow the bolt to extend through, and
   wherein the washer-receiving hole is provided with a washer whose lower surface is metal-touched to the roof panel.

4. The vehicle roof-rail structure according to claim 2, wherein the lower sealing rib has a shorter height than the second lower sealing rib.

5. The vehicle roof-rail structure according to claim 4, wherein the protector has a washer-receiving hole at such a position as to allow the bolt to extend through, and
   wherein the washer-receiving hole is provided with a washer whose lower surface is metal-touched to the roof panel.

6. The vehicle roof-rail structure according to claim 1, wherein the leg includes a projection that projects downward and is fitted to a fitting part of the protector, and
   wherein the bolt is an insert bolt permanently affixed to the projection.

7. The vehicle roof-rail structure according to claim 6, wherein the fitting part of the protector is fitted into a mohican groove defined by lateral end portions of the roof panel, and
   wherein the insert bolt extends through the mohican groove.

8. The vehicle roof-rail structure according to claim 1, wherein the protector includes a skirt at an outer periphery thereof, the skirt undergoing elastic deformation to contact the roof panel and a sidewall of a mohican groove.

9. The vehicle roof-rail structure according to claim 1, wherein the protector is made of an elastic material selected from the group consisting of thermoplastic elastomer and synthetic rubber.

10. The vehicle roof-rail structure according to claim 1, wherein the leg is a molded component made of a synthetic resin, and
   wherein the rail body is an extrusion-molded part made from an aluminum alloy.

11. The vehicle roof-rail structure according to claim 1, further comprising a leg cover disposed over the leg,
   wherein the leg cover has a receiving recess into which an end part of the rail body is fitted.

12. The vehicle roof-rail structure according to claim 11, wherein the protector includes a groove at a periphery thereof, and
   wherein a lower end of the leg cover is fitted into the groove.

13. The vehicle roof-rail structure according to claim 11, wherein the rail body is fastened to the leg cover with bolts inserted through the leg into rivet nuts attached to the rail body.

14. The vehicle roof-rail structure according to claim 1, wherein the protector includes hooks arranged at a periphery thereof, and
   wherein the leg includes hook-receiving parts that receive the hooks to position the leg on the protector.

15. The vehicle roof-rail structure according to claim 1, wherein the leg includes bolt-inserting recesses provided with insert spacers, and
   wherein bolts are inserted through the insert spacers to fasten the rail body to the leg member.

16. The vehicle roof-rail structure according to claim 1, wherein the lower sealing rib and the upper sealing rib undergo elastic deformation when the fastener is tightened, closing gaps around the bolt in a watertight manner.

17. The vehicle roof-rail structure according to claim 1, wherein the roof panel includes a roof top panel and a roof side panel joined to form a mohican groove, and wherein the leg member is fixed at the mohican groove.

18. A vehicle roof-rail structure comprising:

a rail body extending in a front-rear direction of a vehicle body; and a leg member with which the rail body is fixed to a roof panel of the vehicle body, wherein the leg member comprises:

a protector that is in contact with the roof panel;

a leg disposed on the protector;

a fastener comprising a bolt projecting from a bottom of the leg, the fastener fastening the leg member to the roof panel with the bolt being made to extend through the protector and the roof panel; and a water stopper for providing watertightness around the fastener, wherein the water stopper comprises:

a lower sealing rib that projects from a lower surface of the protector in such a manner as to surround the bolt and is brought into contact with the roof panel; and an upper sealing rib that projects from an upper surface of the protector in such a manner as to surround the bolt and is brought into contact with a bottom surface of the leg, wherein the protector has a washer-receiving hole at such a position as to allow the bolt to extend through, and wherein the washer-receiving hole is provided with a washer whose lower surface is metal-touched to the roof panel.

* * * * *